L. G. McKAM.
SAW SWAGE AND SHAPER.
APPLICATION FILED JAN. 26, 1911.

1,056,434.

Patented Mar. 18, 1913.

2 SHEETS—SHEET 1.

Witnesses

Inventor
Lawrence G. McKam
By Parker & Burton
Attorneys

L. G. McKAM.
SAW SWAGE AND SHAPER.
APPLICATION FILED JAN. 26, 1911.
1,056,434.
Patented Mar. 18, 1913.
2 SHEETS—SHEET 2.
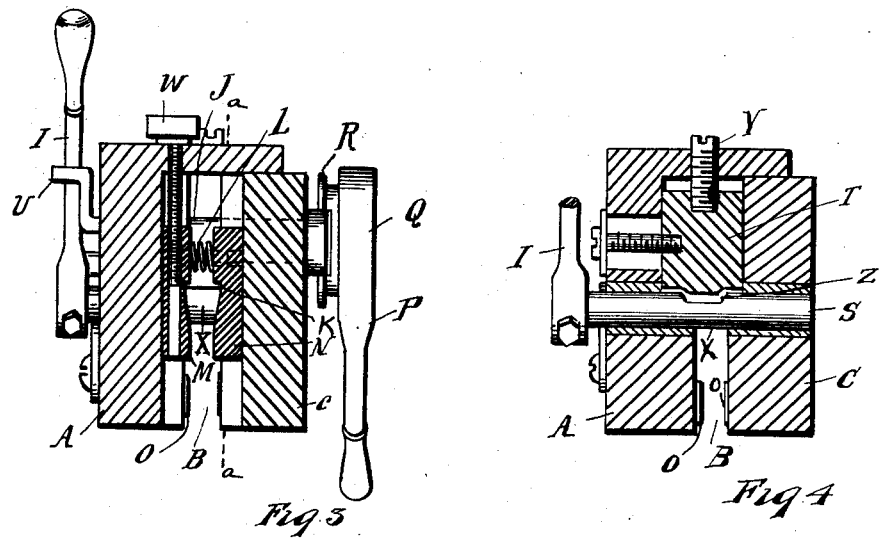
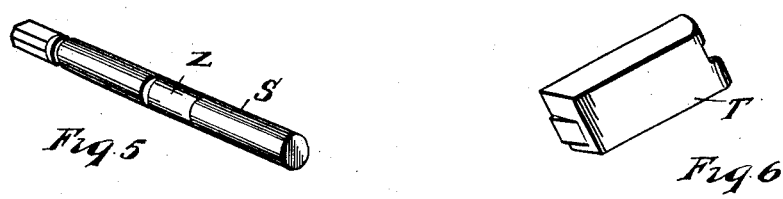
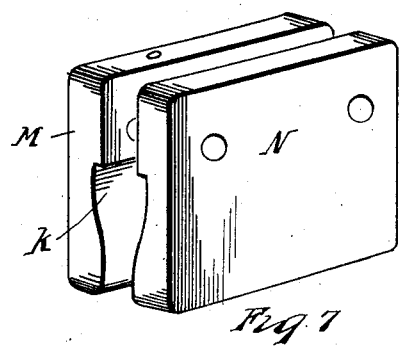
Witnesses
C. E. Day
Vera Tillman
Inventor
Lawrence G. McKam
By Parker & Burton
Attorneys
COLUMBIA PLANOGRAPH CO., WASHINGTON, D. C.

UNITED STATES PATENT OFFICE.

LAWRENCE G. McKAM, OF DETROIT, MICHIGAN, ASSIGNOR TO STANDARD SAW AND MANUFACTURING COMPANY, OF DETROIT, MICHIGAN, A CORPORATION OF MICHIGAN.

SAW SWAGE AND SHAPER.

1,056,434.  Specification of Letters Patent.  Patented Mar. 18, 1913.

Application filed January 26, 1911. Serial No. 604,728.

*To all whom it may concern:*

Be it known that I, LAWRENCE G. McKAM, who am a citizen of the United States, residing at Detroit, county of Wayne, State of Michigan, have invented a certain new and useful Improvement in a Saw Swage and Shaper, and declare the following to be a full, clear, and exact description of the same, such as will enable others skilled in the art to which it pertains to make and use the same, reference being had to the accompanying drawings, which form a part of this specification.

This invention relates to saw swagers and shapers, and has for its object an improved device of this type in which the clamping of the saw blade in place and the shaping of a tooth are accomplished at one movement, and while the saw blade is thus held in place a coöperating anvil and swaging shaft accomplish the swaging of another tooth farther along the same blade.

Figure 1:
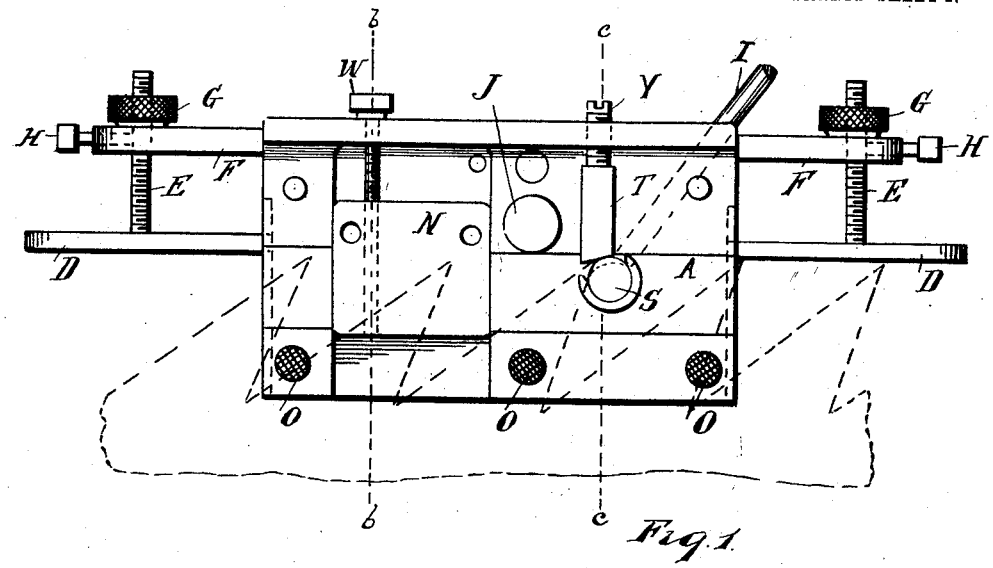
Figure 2:
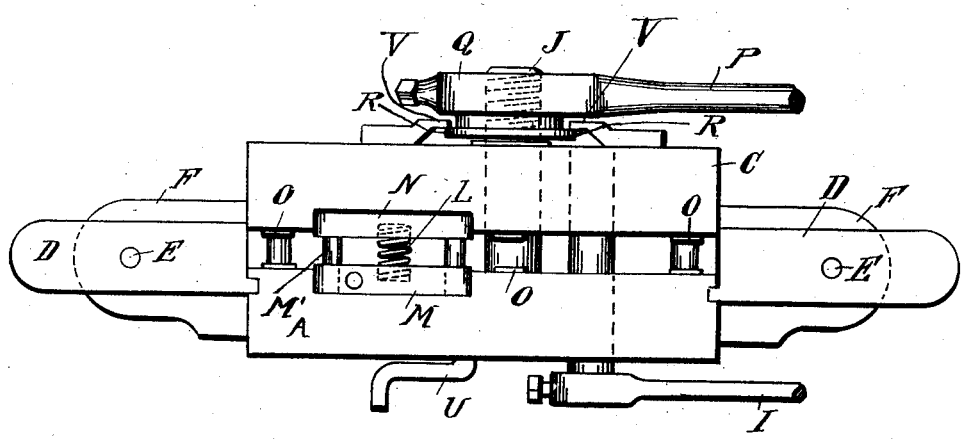

In the drawings:—Figure 1, is a side elevation of the center portion of the tool (along the line *a—a* of Fig. 3) with one of the side blocks removed to expose the inner parts. Fig. 2, is a plan view from beneath showing the actuating levers and the interior parts which lie adjacent to the kerf in the holding block. Fig. 3, is an elevation largely in section transverse of the saw kerf, along the line *b—b* of Fig. 1. Fig. 4, is a sectional elevation along the line *c—c* of Fig. 1, showing the anvil and the swaging shaft. Fig. 5, is a perspective of the swaging shaft. Fig. 6, is a perspective of the anvil. Fig. 7, is a perspective of the spring-separated shaping blocks, removed from the holding block.

The saw kerf B is formed by the two housing blocks A and C, the latter of which is slidable toward or away from the block A along the shaft J. Slidably engaging in grooves in each end of the block A are the ends of adjustment gages D, against whose surfaces the tips of the adjacent saw teeth rest. These gages are adjustable up and down with respect to the housing block by means of the screws E, which pass through brackets F, being regulated by the nuts G. When the adjustment to the desired degree has been secured, each screw E may be clamped against further and unintended movement by means of the set screw H. The swaging blocks M and N engage in recessed portions of the block A and the block C respectively, and are yieldingly held apart and against the housing blocks by the spring L.

The shaping blocks M and N have longitudinal grooves K that extend from end to end and form die faces of the same impression at all points in the direction of the run of the saw teeth through the dies. It will be noted that these grooves are of gradually enlarging depth toward the top of the dies. Each of the housing blocks A and C is provided with a plurality of gripping surfaces O which are adapted to engage and hold the saw blade when the blocks are forced toward each other. The forcing of the blocks toward each other is accomplished by the threaded engagement of the nut Q that forms the terminal of the lever P with the threaded portion of the shaft J. The adjacent inner surfaces of the blocks A and C are roughened at the points O to guard against the slipping of the saw blade with respect to the blocks.

When the lever P is turned, the nut Q runs on the threads of the shaft J and forces the housing block C toward the housing block A, thereby simultaneously pressing the shaping dies M and N against the previously swaged tooth and vising the saw at the gripping surfaces O. The shaping dies M and N, as already alluded to, are of the same impression along the run of the saw teeth, so that it matters not, within given limits, what the distance between adjacent saw teeth is, as the saw tooth to be swaged will be shaped similarly at any point that it comes in contact with the dies. As already explained, the die faces are cut with grooves of gradually enlarging depths. The screw W that projects through the top of the block A raises or lowers the block M when it is turned. Referring to Fig. 2, it is seen that the shaping block N is provided with a pair of pins M' that have a sliding engagement in the block M that allows the two blocks to approach or withdraw from each other, but which causes them to move up and down together. Therefore, by adjusting the screw W, the width of the tooth point can be either enlarged or diminished, depending upon whether the adjustment of the dies is downward or upward. This adjustment results in giving the previously swaged saw tooth the shape desired. While the parts are in this position, with the saw blade firmly held against movement, the swaging shaft S, which extends transversely of both blocks, is actuated by means of the lever I. The cut-away portion Z against which, up to that time, the edge of the saw tooth whose swaging is desired has lain (the other oblique edge of the tooth lying against the anvil T), turns with the shaft so that the cylindrical portion X of the shaft engages against the tooth, resulting in broadening the end of the tooth to the desired degree. Both levers are now actuated in the reverse directions, resulting in releasing one tooth from the engagement between the cut-away portion of the shaft and the anvil T, and in releasing the other from the clamping effect of the blocks M and N, so that the blade may now be slid along with respect to the holding block for engagement of the newly swaged tooth by the shaping blocks and the swaging of the next tooth along the saw blade. The withdrawal of the housing block C from the housing block A is effected by the shoulders V V engaging in the annular race R of the nut Q. Adjustment as to height of the anvil T, may be effected as desired by means of the screw Y which passes through the upper surface of the block A. The throw of the swaging lever I is limited to the desired degree by the adjustable bracket U.

What I claim is:—

1. A combined swage and shaper, having in combination swaging mechanism, a pair of compressible shaping dies of relatively long extent in the direction of the run of the saw teeth and of the same impression at all points in such extent, so as to accommodate teeth varyingly spaced, the said dies being adapted to engage the tooth adjacent to the tooth undergoing the swage operation, the device thereby being adapted to swage and shape successive teeth at one setting and vising thereof, substantially as described.

2. A combined swage and shaper, having in combination swaging mechanism, a pair of compressible shaping dies of relatively long extent in the direction of the run of the saw teeth and of the same impression at all points in such extent, so as to accommodate teeth varyingly spaced, the said dies being adapted to engage the tooth adjacent the tooth undergoing the swage operation and to shape the same at the same setting and vising of the device the said dies being cut with a vertically enlarging space therebetween and means for vertically adjusting the dies in relation to the saw whereby the breadth of the tooth point may be varied, substantially as described.

3. A combined swage and shaper, having in combination a pair of compressible shaping dies of relatively long extent in the direction of the run of the saw teeth and of the same impression at all points in such extent, so as to accommodate teeth varyingly spaced, the said dies being adapted to engage the tooth adjacent the tooth undergoing the swage operation and shape the same at the same setting and vising of the device, the said dies being movable toward and from each other and being movable together vertically and having a vertically enlarging spacing and a thumb screw adapted to adjust the dies vertically, substantially as described.

4. A combined swage and shaper, having in combination two housing blocks connected together and arranged to be spaced from each other, a pair of shaping dies located one in each housing block, a lever for causing said blocks to draw together and to separate, thereby, both vising the saw and compressing the shaping dies together, swaging means and a second lever adapted to operate the swaging means, substantially as described.

5. A saw shaper, having in combination, a housing block, a pair of compressible dies cut with a vertically enlarging space therebetween and means for adjusting the dies vertically with respect to the housing block, whereby the breadth of the tooth point may be varied, substantially as described.

6. In a saw swage and shaper, the combination of a pair of separate housing blocks spaced to form a saw receiving kerf, swaging mechanism mounted in the two housing blocks, vising means adapted to compress the housing blocks together and clamp the machine to the saw at several points along the blocks, whereby swinging of the machine is avoided during the swaging operation, and a pair of compressible dies for shaping a tooth adjacent the tooth undergoing the swaging operation, the compression of the dies to afford the shaping being accomplished by the said vising, substantially as described.

7. A combined swage and shaper, having in combination, swaging mechanism, a pair of compressible housing blocks having portions adapted to grip the saw, a pair of compressible shaping dies of relatively long extent in the direction of the run of the saw teeth and of the same impression at all points in such extent, so as to accommodate teeth varyingly spaced, the said dies being yieldingly held one to each housing block and compressible with the housing block and being adapted to engage the tooth adjacent the tooth undergoing the swaging operation, means for compressing the housing blocks together and thereby compressing the dies together, and means for operating the swaging mechanism at the same time the said saw is vised and the adjacent tooth is shaped, substantially as described.

8. A combined swage and shaper, having in combination, swaging mechanism, a pair of compressible housing blocks having portions adapted to grip the saw, a pair of compressible shaping dies of relatively long extent in the direction of the run of the saw teeth and of the same impression at all points in such extent, so as to accommodate teeth varyingly spaced, the said dies being yieldingly held one to each housing block and compressible with the housing blocks and slidable vertically therein, the said dies being also adapted to engage the tooth adjacent the tooth undergoing the swaging operation and to shape the same at the same setting and vising of the machine and being cut with a vertically enlarging space therebetween, means for adjusting the said dies vertically to the saw, whereby the breadth of the tooth point may be varied, means for compressing the housing blocks together and thereby compressing the dies together and vising the saw and means for operating the swaging mechanism, substantially as described.

9. A combined swage and shaper, having in combination, swaging mechanism, a pair of compressible housing blocks having portions adapted to grip the saw, a pair of compressible shaping dies of relatively long extent in the direction of the run of the saw teeth and of the same impression at all points in such extent, so as to accommodate teeth varyingly spaced, the said dies being attached together so as to be capable of sliding toward and from each other and being yieldingly held one in a vertical groove in each housing block, the said dies being also adapted to engage the tooth adjacent the tooth undergoing the swaging operation and to shape the same at the same setting and vising of the machine, means for compressing the housing blocks together and thereby compressing the dies together, means for operating the swaging mechanism, the said dies being further provided with a vertically enlarging space, and a thumb screw located in one of the housing blocks and adapted to control the movement of the two connected dies in the vertical grooves of the housing blocks, substantially as described.

In testimony whereof, I sign this specification in the presence of two witnesses.

LAWRENCE G. McKAM.

Witnesses:
   VIRGINIA C. SPRATT,
   WILLIAM M. SWAN.